United States Patent

[11] 3,623,029

[72] Inventor Evan E. Davidson
Wappingers Falls, N.Y.
[21] Appl. No. 885,153
[22] Filed Dec. 15, 1969
[45] Patented Nov. 23, 1971
[73] Assignee International Business Machines Corporation
Armonk, N.Y.

[54] BISTABLE MULTIEMITTER SILICON-CONTROLLED RECTIFIER STORAGE CELL
1 Claim, 5 Drawing Figs.

[52] U.S. Cl. .......... 340/173 NR, 307/284, 307/299, 307/318, 340/173 FF
[51] Int. Cl. .......... G11c 11/34, G11c 7/00, H03k 17/72
[50] Field of Search .......... 340/173 NR, 173 LS, 173 FF, 173 PE; 307/252.26, 289, 299 A, 284, 318; 317/235 (31), 235 (41.1)

[56] References Cited
UNITED STATES PATENTS 3,236,698 2/1966 Shockley .......... 317/235 (41.1)
3,261,985 7/1966 Somos .......... 317/235 (41.1)
3,463,975 8/1969 Biard .......... 317/235 (31)

OTHER REFERENCES

Schuenemann, Storage Matrix, IBM Technical Disclosure Bulletin, Vol. 11 No. 5, Oct. 1968, 340/173 State, pp. 443.

Tsui, Monolithic Memory, IBM Tech. Disc. Bul., Vol. 13 No. 2, July 1970, 340/173 SS, pp. 486–487.

*Primary Examiner*—James W. Moffitt
*Assistant Examiner*—Stuart Hecker
*Attorneys*—Hanifin and Jancin and James E. Murray

ABSTRACT: This specification discloses a storage cell which employs a single dual emitter silicon-controlled rectifying device as a storage element. This silicon-controlled rectifier device is biased to have two stable-operating states and is addressed by a word line connected to one of its emitters and a bit line connected to the other of its emitters. A transistor is formed by these two emitters and the gating layer of the silicon-controlled rectifier. By application of half select pulses to the word and bit lines this transistor is broken down so as to cause current to flow in the gating region or layer of the silicon-controlled rectifier. When current flows in the gating region the operating characteristic of the silicon-controlled rectifier changes so that the silicon-controlled rectifier switches from a high-voltage, low-current stable state to a low-voltage, high-current stable state along the operating curve of the silicon-controlled rectifier.
To increase the turnoff speed of the silicon-controlled rectifier a Schottky Barrier diode is connected between the gating layer and the other intermediate layer of the silicon-controlled rectifying device to discharge charge stored in the junction between the two layers.

INVENTOR
EVAN E. DAVIDSON

BY James E. Murray
ATTORNEY

BISTABLE MULTIEMITTER SILICON-CONTROLLED RECTIFIER STORAGE CELL

BACKGROUND OF THE INVENTION

This invention relates to silicon-controlled rectifier circuits and more particularly to storage cells employing such silicon-controlled rectifiers.

In copending application Ser. No. 885,152 filed on even date herewith (Dec. 15, 1969) and entitled "Variable Breakdown Storage Cell" (IBM docket P–69–019), a storage cell is described which employs a single dual emitter transistor biased to operate on negative resistance characteristics. The emitters of this transistor are biased to break down a parasitic transistor formed by the two emitters and base of the storage cell transistor. This breakdown of the parasitic transistor is then used to vary the operating characteristic of the storage cell transistor from the mentioned negative resistance characteristic and thereby change the state of storage cell transistor from its high-impedance state to its low-impedance state. The silicon-controlled rectifier would be quite desirable to use in such a memory cell because of its low-power consumption in either of its high- or low-impedance operating states. However the control rectifier has always been slow in turning off. This is due to charge stored in the intermediate zones of the device when the device is turned on.

BRIEF DESCRIPTION OF THE INVENTION

In accordance with the present invention this problem is solved by the addition of a Schottky Barrier diode between the two intermediated zones of the device. The Schottky Barrier Diode turns on at a lower potential than the junction between the two intermediate zones to prevent this junction from turning on. This eliminates the long storage constant associated with silicon-controlled rectifiers. The fast turnoff time of this modified silicon-controlled rectifier coupled with the normally fast turnoff of silicon-controlled rectifiers make it particularly desirable in high-speed logic and memory circuits.

Therefore it is an object of the present invention to provide a storage cell which can be rapidly accessed for reading and/or writing.

The second object is to provide a storage cell which dissipates very little energy.

Another object of the invention is to provide a storage cell which operates on a negative-resistance characteristic of a single semiconductor device.

DESCRIPTION OF DRAWINGS

These and other objects, features and advantages of the invention will be apparent from the following more particular description of a preferred embodiment of the invention as illustrated in the accompanying drawings of which:

FIG. 1 shows a characteristic curve 10 for a silicon-controlled rectifier. As the plate or anode voltage V of the silicon-controlled rectifier is increased in potential eventually it reaches the point Vmax where device breakdown occurs and voltage decreases with increasing currents until the voltage Vsus is reached. Thereafter the current increases with substantially no change in voltage.

Figure 2:
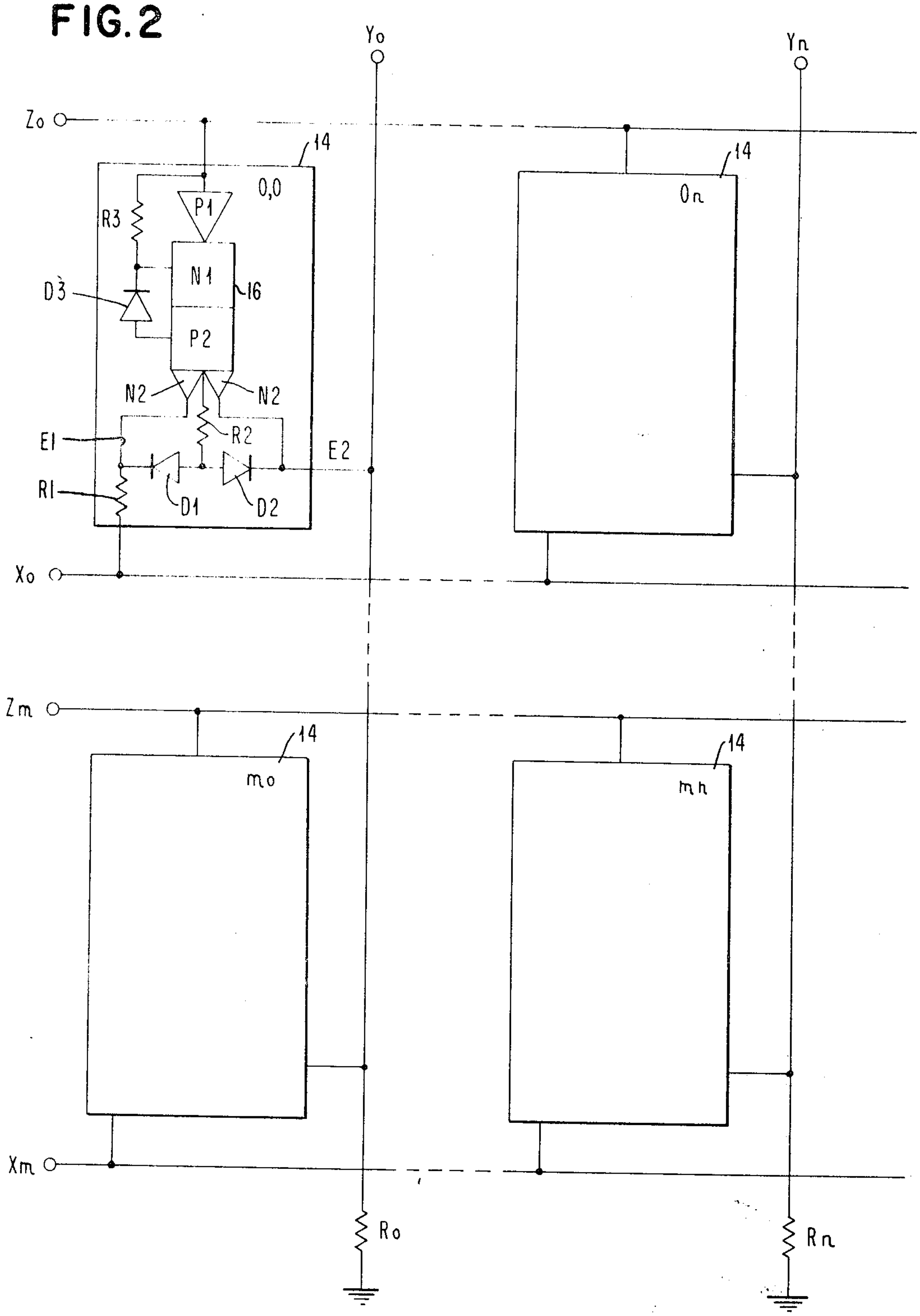
FIG. 2 is a schematic of a monolithic memory arrangement fabricated in accordance with the present invention.

By properly placing a load line 12 on this negative-resistance characteristic 10 a 2-state memory cell can be devised. Such a cell is shown in FIG. 2 as the memory cells 14 in a monolithic memory matrix accessed by word write lines XO through XM, word read lines ZO through ZN and bit sense drive lines YO through YM. Each of the cells 14 contains a multiemitter silicon-controlled rectifier device 16 with an operating characteristic similar to curve 10 when properly biased.

Such a cell will now be discussed in connection with position O,O of the matrix. It differs from the other cells in the matrix only inasmuch as the other cells are accessed by different word and bit lines. The anode of device 16 is connected directly to the word read ZO while one of the emitters E1 is connected through a resistor R1 to the word write line YO for the other emitter E2 connected directly to the bit line YO for the storage cell. Connected between the emitters E1 and E2 is a biasing circuit for biasing the gate of the silicon-controlled rectifier 16. This biasing circuit consists of two back to back diodes D1 and D2 between the emitters E1 and E2 and a resistor R2 joining the anodes of diodes D1 and D2 to the gating layer of the silicon-controlled rectifier.

The silicon-controlled rectifier 16 is biased for bistable operation along its negative-resistance characteristic 10 by the word read line to word write line potential. The resistor R1 and negative-gating current supplied through the described biasing circuit so that there exists two stable-operating states referred to as the "0" and "1" states in FIG. 1. [In addition to the load resistance R, the biasing circuit and the silicon-controlled rectifier 16 each storage cell 14 also contains a Schottky Barrier Diode D3 coupling the gating zone P2 to the other intermediate zone N1 of the silicon-control rectifier and a resistor R3 connecting the anode of the silicon-controlled rectifier 16 to the intermediate zone N1]. While the storage cell 14 is storing information, that is it is not being accessed for reading or writing, the ZO word line is held at +2 volts, the XO word line is maintained at ground potential while the YO bit line is maintained at 1,5 volts above ground so that emitter E1 conducts and the emitter E2 is backbiased. This assures that the storage cell 14 will be in either the "1" or "0" operating states shown in FIG. 1 since the current will flow from the ZO word line into anode terminal through the emitter terminal E1 and the load resistance R1 to the XO word line. The potential difference between the anode and the emitter E2 of the silicon-controlled rectifier 16 is below Vsus for the silicon-controlled rectifier 16 so that conduction through the emitter E2 will not be sufficient to sustain the silicon-controlled rectifier in its "1" stable state while the ZO sense line is being maintained at +2 volts.

Figure 1:
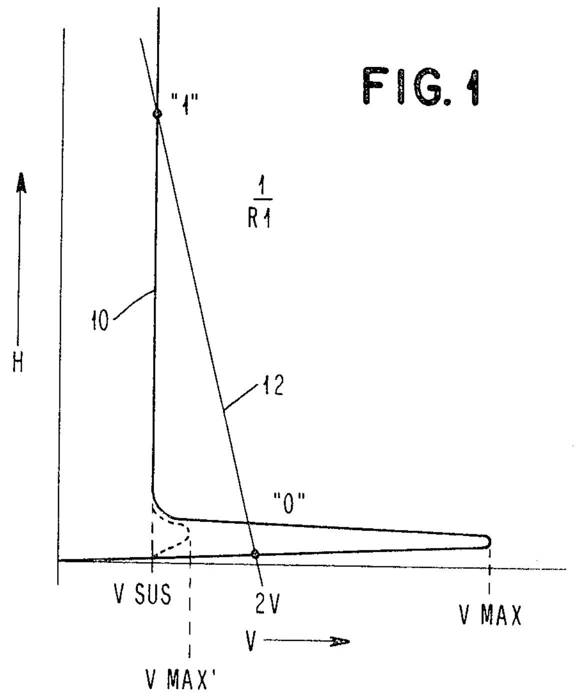
FIG. 1 is a graph showing how the negative-resistance characteristic of a silicon-controlled rectifier varies as a function of a gate bias.

Assume now that data is to be written into the cell and for this purpose the storage cell is assumed to be initially in the "0" operating state. Then if a "1" is to be written into the cell the potential on the XO word line is raised to +3 volts while the potential on the YO bit line is reduced to "0" volts. This causes conduction to occur between the XO word line and the YO bit line as a result of breakdown in a lateral parasitic transistor consisting of emitter regions E1 and E2 and the gating region P2. When this occurs positive current flows in the gating region cancelling the negative current flow through the gating region and resistor R2. This changes the operating curve 10 of the silicon-control rectifier reducing the maximum potential that can be sustained across the silicon-controlled rectifier from Xmax to Vmax' as shown in FIG. 1. Therefore the silicon controlled rectifier 16 is no longer stable at the "O" operating point on the load line 12 and conduction shifts to the "1" operating point on the curve which is the only stable operating point on the load line 12.

Figure 3:
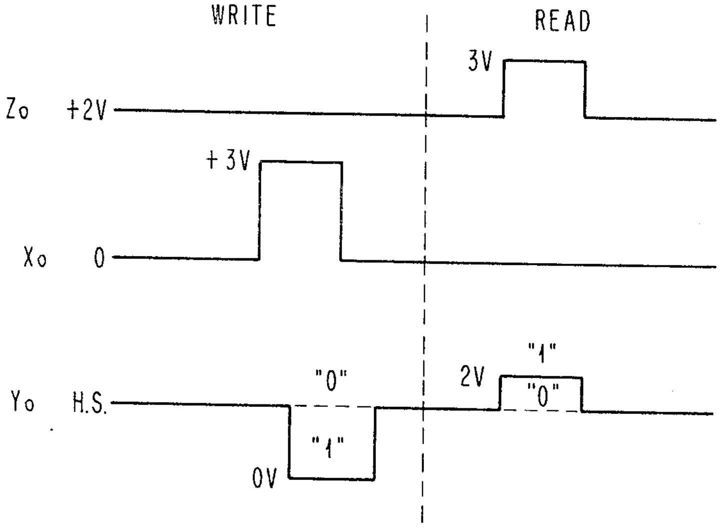
FIG. 3 is a graph of potentials employed in accessing the storage cells shown in FIG. 2.

After the coincident half select voltages subside to their quiescent values, the maximum voltage increases to Vmax again. However, the cell still operates at the "1" point on the curve 10 since the potential V is sufficient to exceed the minimum potential Vsus along the load line 12. Therefore the cell is now in the "1" operating state and stores a "1". If the cell had initially been in its "1" operating state when the two pulses had been applied it would have remained and when the word and bit lines were driven by the half select coincident pulses shown in FIG. 3.

Assume now that a "1" is stored in the storage cell 14 and a "0" is to be written into the storage cell. The the XO word line is pulsed with a +3 volt while the ZO word line is maintained at +2 V and the YO bit line is maintained +1.5 volt. This reduces the voltage across the silicon-controlled rectifier 16 below Vsus so that conduction through the silicon-controlled rectifier 16 can no longer be sustained at this level. Thus operation of the silicon-controlled rectifier 16 slips below Xmax on the operating curve 10. When the "O" write pulse subsides the silicon-controlled rectifier 16 will be operating at its "0" stable state since the potential difference between the anode on either emitter is not sufficient to drive silicon-controlled rectifier 16 to operate beyond Vmax on the load line 12. If the silicon-controlled rectifier 16 had been operating at the "0" point on the load line 12 when the write "0" pulse was applied to the XO word line it would still be operating there after the "0 write pulse.

Therefore, it can be seen that the transistor 20 has two stable states and can be switched between the two stable states by half select potentials which can be applied to the emitter E1 and E2. For this reason binary data can be stored in any location O, 0 to *mn* in the memory by the proper selection of one of the bit lines YO to YN and one of the word lines XO to XN.

Data can be read out of the storage cell by raising the potential on the ZO word read line to +3 volts so that the emitter E2 conducts along with emitter E1. If a "1" is stored in the cell the current being conducted through silicon-controlled rectifier 16 is heavy during read. This heavy conduction through the silicon-controlled rectifier 16 passes through resistor RO to produce a large read pulse on the YO bit line that can be sensed by a sense amplifier as a stored "1". If a "0" is stored in the storage cell, significantly less current passes through the silicon-controlled rectifier 16 during read time. This current would produce a significantly smaller voltage across the resistor RO which the sense amplifier would recognize as a stored "0."

Due to the fact that the resistance R1 is not in the read out path when data in the storage cell is being read out, the load resistance R1 may be selected with respect to the sense resistance RO to provide a large read output signal while at the same time assuring that the cell operates at a low-power level while it is not being accessed for reading or writing. For this purpose resistor R1 is selected to be significantly larger than resistor R0. Therefore considerably larger current flows through resistor RO than through resistor R1 at read time. Furthermore, while the cell is not being read or accessed for reading or writing power consumption in the storage cell is maintained low by the high impedance of resistor R1.

As we mentioned previously, a bias network consisting of diodes D1 and D2 and resistor R2 is connected between the emitters E1 and E2 and the gating layer P2 of the silicon-controlled rectifier 16. The purpose of this network is to leak charge off the gating layer of the silicon-controlled rectifier 16. This leakage current is the negative current that biases the silicon-controlled rectifier 16 on the curve 10. Furthermore, it prevents charge from building up in the gating layer P2 and cause the silicon-controlled rectifier to switch states in response to the noise signals on the word and bit lines.

The diodes D1 and D2 are included in the circuit so that positive current does not flow into the gating layer through resistor R2. These diodes D1 and D2 are back biased by addressing pulses on the word and bit lines so that a half select signal will not trigger a change in the state of the cell. In the forward direction a 0.4 voltage drop across diodes D1 and D2 renders them conductive as compared to the gate to emitter drop of about 0.7 v. to render the silicon-controlled rectifier 16 conductive. This assures that the voltage drops across the resistor R2 and the diodes D1 and D2 produced by the leaking base charge will not cause the base to emitter junctions of the silicon-controlled rectifier 16 to conduct and therefore cause spurious signals.

Diode D3 is also selected to conduct about 0.4 volts to prevent the N1, P2 junction of the silicon-controlled rectifier 16 from conducting and thereby storing charge in the gating layer of the device. By preventing this storing of charge in this manner we decrease the turnoff time of the silicon-controlled rectifier. This coupled with the normally fast turn on time of the silicon-controlled rectifier enables rapid access times for the storage cell. The resistor R3 is added to decrease the sensitivity of the silicon-controlled rectifier to variations in voltage along the line by leaking charge off the intermediate region N1.

Figure 4:
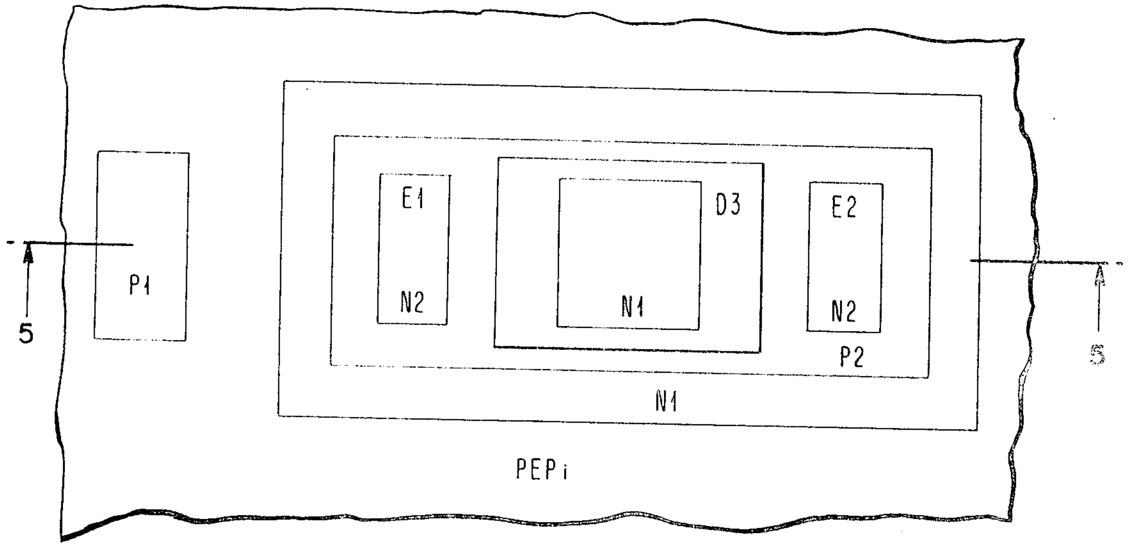
FIG. 4 is a plan view of one monolithic form of the silicon-controlled rectifier of the present invention.
Figure 5:
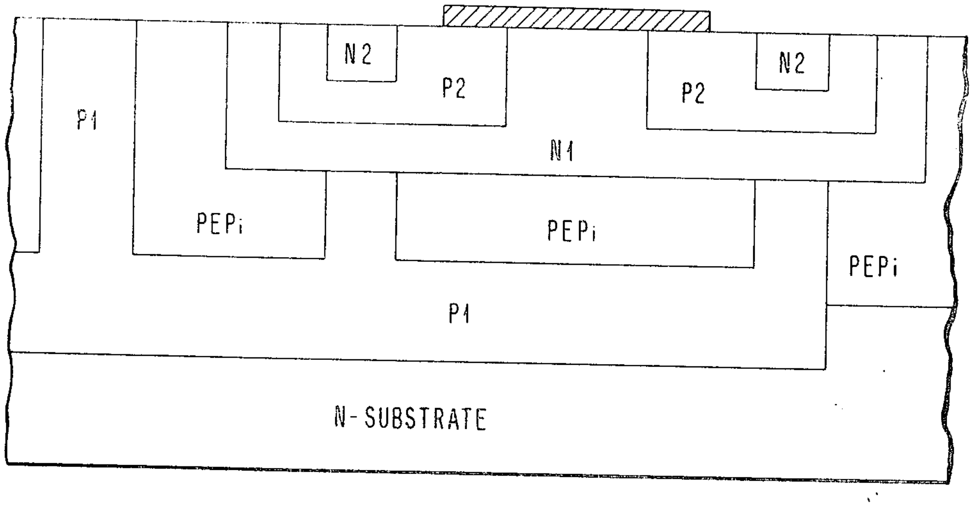
FIG. 5 is a section taken along line 5–5 in FIG. 4.

The silicon-controlled rectifier of the present invention can be fabricated as shown in FIGS. 4 and 5. As shown in those FIGS. P-subcollector diffusion is placed in a N-substrate. Thereafter an epitaxial layer is partially grown. The epitaxial growth process is then stopped and P-diffusions made in the epitaxial layer so as to contact the subcollector diffusion. The epitoxial layer is then completed and successive N, P and N diffusions are made therein as illustrated. The Shottky Metal Barrier Diode is then placed over the N1 diffusion to form the Shottky diode joining the N1 and P2 diffusions in FIG. 2. The regions in FIGS. 4 and 5 have been enumerated to show what regions they correspond to in FIG. 2.

While the invention has been shown and described with reference to a preferred embodiment thereof it will be understood by those skilled in the art that various changes in form and details may be made therein without departing from the spirit and scope of the invention.

What is claimed is:

1. A storage cell comprising:

a four zone semiconductor device exhibiting a negative-resistance operating characteristic changeable by variation in current applied to the gating zone of the device, said semiconductor device being a multiemitter device with two emitter regions in said gating region so that the emitter regions with the gating regions form a transistor;

load means for biasing said four zone semiconductor device so that the four zone semiconductor device has two stable operating states along the negative-reisistance characteristic, the first state being a high-voltage low-current state and the second state being a low-voltage high-current state;

a unidirectional current path means for discharging charge accumulated in the gating region to the emitters of the device to cause current flow in the gating region to bias the four zone semiconductor device on said negative-resistance characteristic;

biasing means for injecting current into the gating region of the four zone semiconductor device to change the negative-resistance characteristic so that the four zone semiconductor device switches from the first stable state to the second stable state; and Schottky barrier diode means connected between the gating region and the other intermediate region of the four zone semiconductor device to shunt current by the junction between the two regions, said Schottky barrier diode means conducting at a smaller potential than that potential at which the junction between the gating layer and the other intermediate layer conducts so that the Schottky barrier diode conducts prior to said junction.

* * * * *